United States Patent
Butterfield et al.

(10) Patent No.: US 6,874,584 B2
(45) Date of Patent: Apr. 5, 2005

(54) DISC FURROW OPENER SCRAPER POSITIONING SYSTEM

(75) Inventors: Robert Butterfield, St. Brieux (CA); Randolph ven der Buhs, St. Brieux (CA); Mark Cresswell, St. Brieux (CA)

(73) Assignee: Bourgault Industries Ltd., Saskatchewan (CA)

( * ) Notice: Subject to any disclaimer, the term of this patent is extended or adjusted under 35 U.S.C. 154(b) by 26 days.

(21) Appl. No.: 10/291,032

(22) Filed: Nov. 8, 2002

(65) Prior Publication Data

US 2004/0149465 A1 Aug. 5, 2004

(51) Int. Cl.$^7$ .......................... A01B 15/16; A01B 23/06
(52) U.S. Cl. ...................... 172/559; 172/566; 172/610; 111/167
(58) Field of Search ................... 172/558, 566, 172/559, 560, 561, 562, 563, 564, 570, 572, 606, 610; 111/163, 167, 168, 52, 139, 140, 141, 191

(56) References Cited

U.S. PATENT DOCUMENTS

| | | | | |
|---|---|---|---|---|
| 1,721,876 A | * | 7/1929 | Davis et al. ................ | 172/558 |
| 1,723,705 A | * | 8/1929 | Packer ........................ | 172/558 |
| 1,726,278 A | * | 8/1929 | Strandlund .................. | 172/168 |
| 4,858,699 A | * | 8/1989 | Poltrock ..................... | 172/558 |
| 6,024,179 A | * | 2/2000 | Bourgault ................... | 172/566 |
| 6,237,696 B1 | * | 5/2001 | Mayerle ..................... | 172/558 |
| 6,237,697 B1 | * | 5/2001 | Butterfield et al. ......... | 172/566 |
| 6,260,632 B1 | * | 7/2001 | Bourgault et al. .......... | 172/566 |

* cited by examiner

Primary Examiner—Christopher J. Novosad
(74) Attorney, Agent, or Firm—Frost Brown Todd LLC

(57) ABSTRACT

A furrow opener apparatus comprises a disc rotatably attached to the apparatus such that when the disc engages the ground, a furrow is formed adjacent to a trailing face of the disc. A scraper has a scraper blade oriented substantially parallel to the trailing face of the disc, and mounted such that the scraper blade is oriented in close proximity to or touching a lower portion of the trailing face adjacent to an outer edge of the disc. The scraper is adjustably attached to the apparatus such that the scraper blade can be moved inward along the trailing face of the disc as the disc wears while being maintained substantially parallel to the trailing face of the disc and in close proximity to or touching the trailing face of the disc. A delivery tube for agricultural material can be attached to the apparatus so that it moves in conjunction with the scraper, and the scraper can be biased against the face of the disc.

19 Claims, 4 Drawing Sheets

DISC FURROW OPENER SCRAPER POSITIONING SYSTEM

This invention is in the field of furrow openers for agricultural operations, and in particular adjustment mechanisms to provide satisfactory operation of disc furrow openers as the disc wears.

BACKGROUND OF THE INVENTION

In agricultural seeding operations agricultural materials, such as seed and fertilizer, are deposited in furrows that are opened in the soil by a furrow opener. The furrow openers are attached to an implement frame and pulled along a field.

Agricultural materials are carried from a storage tank or the like by one or more tubes that have output ends attached to the furrow opener. The agricultural materials pass from the output end of the tube into a seed boot or the like attached to the furrow opener that directs the material into the furrow. For liquid fertilizer, the output end of the tube may simply be oriented such that the liquid drops into the furrow. Double shoot furrow openers are also available where two furrows are formed and different agricultural materials are directed into each furrow.

Although such furrow openers are known in a wide variety of configurations, one common configuration includes a rotating disc. The disc is typically rotatably attached, in a generally upright orientation, to an arm which in turn is pivotally attached to the frame about a substantially horizontal axis so as to allow the disc to move up and down. The furrow opener apparatus will include some means, such as a spring, hydraulic cylinder, or the like, to bias the arm downward such that the lower edge of the disc engages the ground to create a furrow.

The rotational axis of the disc is typically oriented at an angle to the direction of travel such that when the disc is pushed down into the soil, soil is moved laterally along a leading face of the disc, and a groove or furrow is thus created adjacent to the trailing face of the disc. The output end of the tube is attached to the furrow opener adjacent to the trailing face of the disc and directs agricultural materials into the furrow just behind the trailing face.

Soil and debris sometimes clings to the trailing face of the disc and can prevent the agricultural materials from falling into the furrow, or jam in the output end plugging the boot or tube. The agricultural material generally falls down adjacent to the trailing face, and so such soil and debris blocks its path, with the result that the agricultural material falls on the ground adjacent to the furrow, or only part way into the furrow. Ideally the agricultural material falls right to the bottom of the furrow, and it is the objective of furrow opener design to have the disc and material outlet oriented relative to each other to achieve that end.

To clean the soil and debris from the trailing face of the disc a scraper is typically provided with a blade parallel to, and closely adjacent to or touching, the trailing face. Often the scraper is biased against the trailing face. The scraper is located generally against a lower portion of the trailing face of the disc. The blade of the scraper is located generally across the trailing face so that a substantial portion of the face from near the outer edge of the disc towards the center thereof is scraped clean.

The scraper can also serve to prevent soil from falling back into the furrow before the agricultural material is deposited. Typically the scraper is oriented at an angle outward from the blade, and the agricultural material output is located behind the scraper such that the path of the agricultural material into the furrow is protected from soil and debris that is disturbed by the disc or scraper, and such that the agricultural material is confined adjacent to the trailing face, and conveniently between the scraper and the trailing face of the disc, and so falls into the furrow. For satisfactory operation, the disc, tube and scraper must be oriented in a cooperating relationship to each other so that the agricultural material falls into the furrow.

Examples of furrow openers incorporating scrapers and means for delivering agricultural materials to a furrow are disclosed in U.S. Pat. No. 6,024,179 to Bourgault, U.S. Pat. No. 6,260,632 to Bourgault et al., and U.S. Pat. No. 6,237,696 to Mayerle.

As the disc is used, it wears down and its diameter becomes smaller. The scraper does not typically wear in the same way, with the result that, as the disc becomes smaller, the scraper extends beyond the edge of the disc such that a portion of the scraper engages the soil instead of the trailing face of the disc. The scraper no longer engages the trailing face of the disc properly because of interference from the soil. Since it is desirable to scrape the trailing face fairly close to the disc edge, the disc can only wear a fairly small amount before the scraper extends beyond the disc edge and proper operation of the scraper is inhibited. The disc must then be replaced, requiring considerable expense and labor.

SUMMARY OF THE INVENTION

It is an object of the present invention to provide a disc furrow opener that overcomes disadvantages associated with known furrow openers. It is a further object of the present invention to provide such a disc furrow opener wherein the scraper that cleans the trailing face of the disc can be adjusted so that as the disc wears and gets smaller, the scraper can be moved inward along the trailing face so that the scraper does not extend past the edge of the disc.

It is a further object of the present invention to provide such a disc furrow opener wherein the output end of the tube that delivers agricultural material to the furrow can also be moved so that the cooperating relationship of the disc, scraper, and the output end of the tube can be maintained.

The present invention provides, in one aspect, a furrow opener apparatus adapted for attachment to an implement for movement along the ground in an operating travel direction. The apparatus comprises a disc rotatably attached to the apparatus in a generally upright orientation at an angle to the operating travel direction such that when a leading face of the disc engages the ground, a furrow is formed adjacent to a trailing face of the disc. A scraper has a scraper blade oriented substantially parallel to the trailing face of the disc, and mounted such that the scraper blade is oriented in close proximity to or touching a lower portion of the trailing face adjacent to an outer edge of the disc. The scraper is adjustably attached to the apparatus such that the scraper blade can be moved inward along the trailing face away from the outer edge of the disc while being maintained substantially parallel to the trailing face of the disc and in close proximity to or touching the trailing face of the disc.

In a second aspect the invention provides a furrow opener apparatus adapted for attachment to an implement for movement along the ground in an operating travel direction. The apparatus comprises an arm adapted for pivotal attachment at a front end thereof to the implement, and a disc rotatably attached to a rear portion of the arm in a generally upright orientation at an angle to the operating travel direction such that when a leading face of the disc engages the ground, a furrow is formed adjacent to a trailing face of the disc. A scraper having a scraper blade is attached to a scraper bracket, and the scraper bracket is attached to the arm such that the scraper blade is oriented substantially parallel to the trailing face of the disc in close proximity to or touching a lower portion of the trailing face adjacent to an outer edge of the disc. The attachment of the scraper bracket to the arm is adjustable such that the scraper bracket can be moved along the arm and can be locked to the arm in a desired location relative to the arm, such that the scraper blade can be moved inward along the trailing face as the disc wears and such that the scraper blade is maintained substantially parallel to the trailing face of the disc and in close proximity to or touching the trailing face of the disc as the scraper blade moves inward.

The furrow opener of the invention extends the life of the disc by allowing the scraper to be moved inward as the disc wears. The scraper scrapes a substantial portion of the trailing face of the disc, but there is room to move it inward along the face of the disc as the disc wears. Preferably the tube for depositing agricultural materials into the furrow is attached to the apparatus so that the cooperating relationship between the tube and scraper adjacent to the trailing face of the disc is maintained during movement. An adjustable biasing force on the scraper blade can be provided as well.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
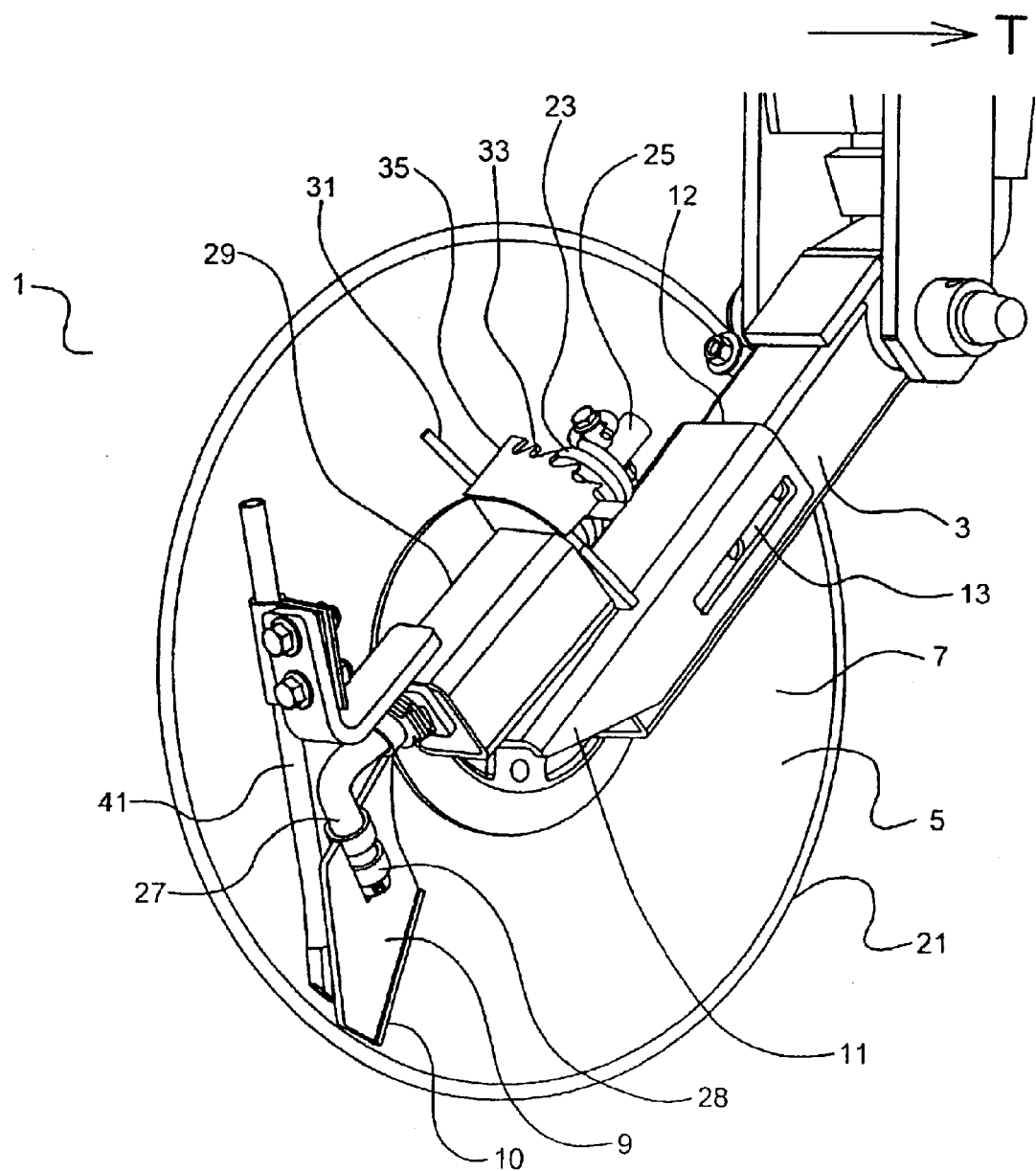
FIG. 1 is a perspective right side view of a disc furrow opener apparatus of the invention with the scraper located in the proper operating position with a new disc.
Figure 2:
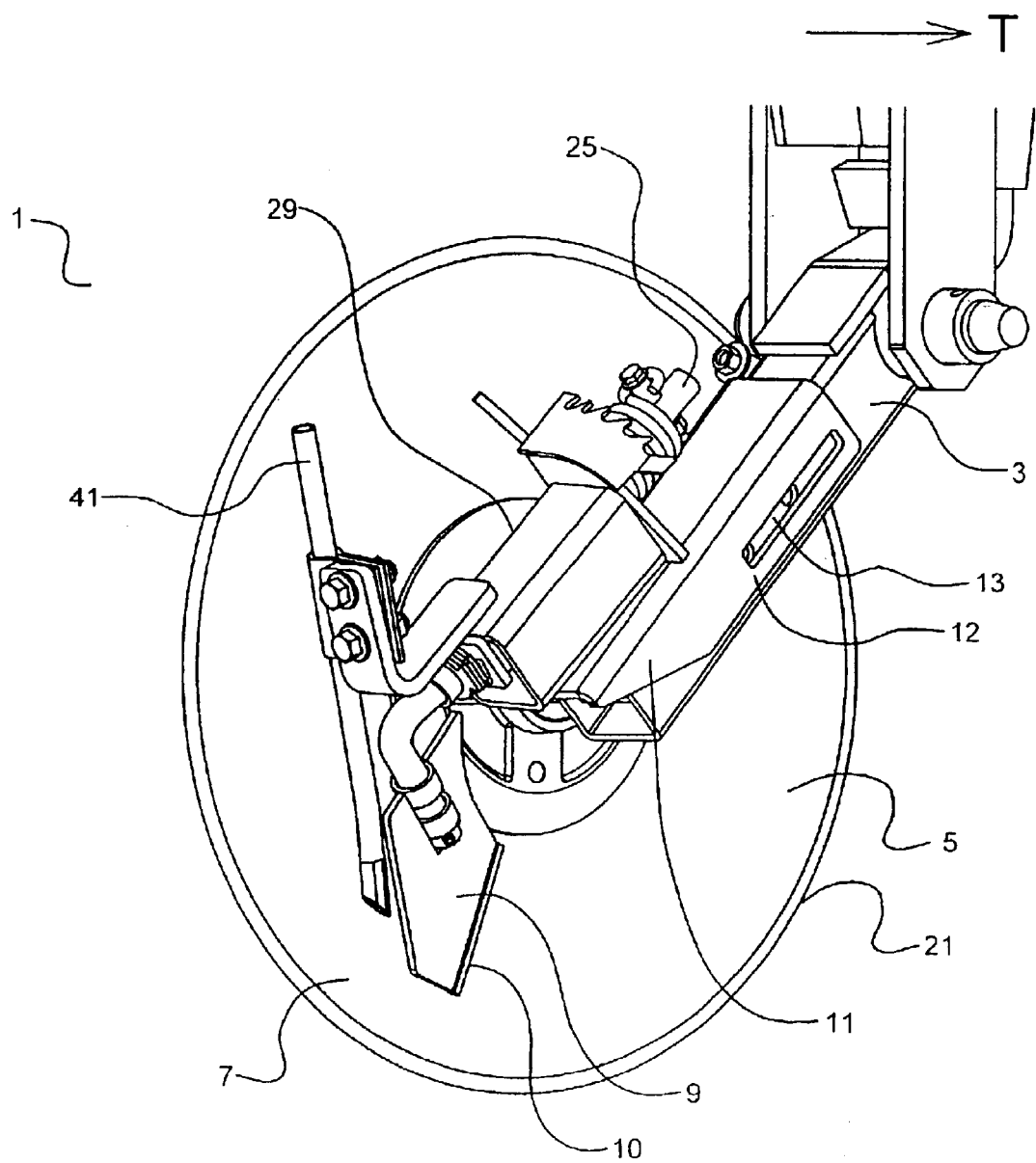
FIG. 2 is a perspective right side view of a disc furrow opener apparatus of FIG. 1 with the scraper located at the inner end of its range of movement indicating that considerable wear can be sustained by the disc of prior to replacement.
Figure 3:
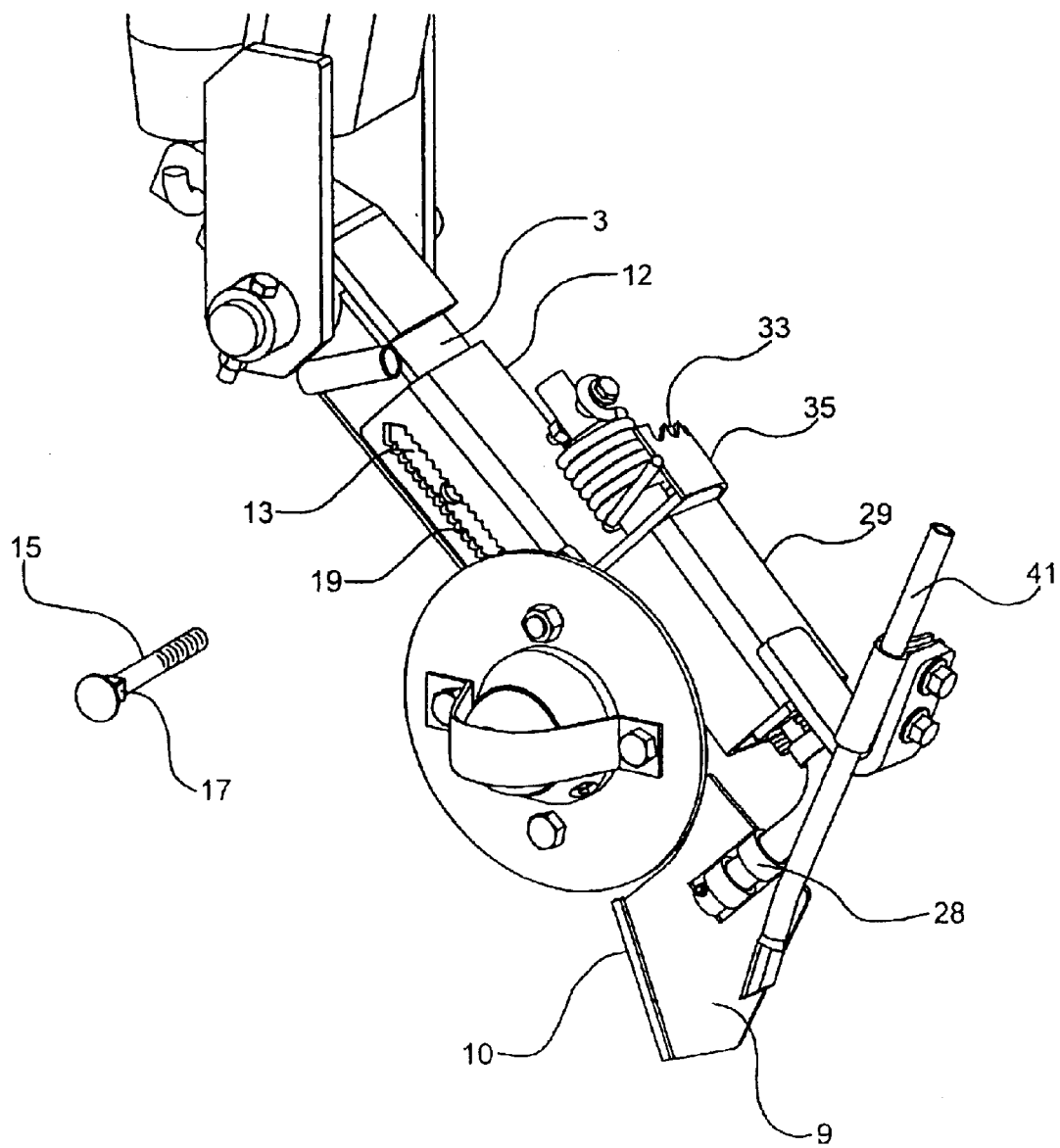
FIG. 3 is a perspective left side view of a disc furrow opener apparatus of FIG. 1 with the disc removed to facilitate observation of the parts of the apparatus.

FIGS. 1–3 illustrate a furrow opener apparatus 1 adapted for attachment to an implement for movement along the ground in an operating travel direction T. The apparatus 1 comprises an arm 3 adapted for pivotal attachment at a front end thereof to the implement;

A disc 5 is rotatably attached to a rear portion of the arm 3 in a generally upright orientation at an angle N to the operating travel direction T such that when a leading face of the disc 5 engages the ground, a furrow is formed adjacent to a trailing face 7 of the disc 5. The disc 5 is illustrated as substantially vertical for clarity of illustration, however discs that are oriented at an angle to the vertical as well as to the operating travel direction T are known and can be used with the apparatus 1 of the invention as well.

A scraper 9 has a scraper blade 10 and is attached to a scraper bracket 11. The scraper bracket 11 is adjustably attached to the arm 3 such that the scraper bracket 11 can be moved along the arm 3 and can be locked to the arm 3 in a desired location relative to the arm 3. In the illustrated embodiment the scraper bracket 11 comprises a sleeve 12 that defines a slot 13 on each side thereof, and the scraper bracket 11 is adjustably attached to the arm 13 by a bolt 15 through the slot 13 and a corresponding hole in the arm 3. Other mechanisms for such adjustable attachment are known and could be utilized as well. The scraper blade 10 can thus be moved inward along the trailing face 7 of the disc 5 as the disc 5 wears.

For proper operation, the scraper bracket 11 should be maintained in a selected relationship with the arm 3. To ensure that the scraper bracket 11 does not slip out of the desired position on the arm 3 the slot 13 on one side of the sleeve 12 is notched, as illustrated in FIG. 3, and the bolt 15 is a carriage bolt comprising a square head 17 that engages notches 19 in the slot 13. Thus, rather than simply securing the scraper bracket 11 by tightening the bolt 15 to exert friction between the sleeve 12 and the bolt 15 and arm 3, the square head 17 is engaged in notches 19 so that as long as the bolt 15 is tight enough to maintain the engagement, the sleeve 12 cannot move with respect to the hole in the arm 3.

The scraper 9 is attached to a rear portion of the scraper bracket 11 behind a center of the disc 5 and extends down behind the center of the disc 5. The scraper blade 10 is oriented substantially parallel to the trailing face 7 of the disc 5 in close proximity to or touching a lower portion of the trailing face 7 adjacent to an outer edge 21 of the disc 5, as best seen in FIGS. 1 and 4.

In the illustrated embodiment the apparatus 1 comprises a bias element, illustrated as coil spring 23, attached to the scraper bracket 11 and operative to exert a bias force against the scraper 9 to push the scraper blade 10 against the trailing face 7 of the disc 5. The scraper 9 is attached to a scraper shaft 25 that extends through and engages the coil spring 23 such that the coil spring 23 exerts the bias force on the scraper shaft 25. As illustrated, a shaft extension 27 extends down from a rear end of the scraper shaft 25 for attachment of the scraper 9. The illustrated scraper 9 is rotatably attached to the shaft extension 27 by mounting rings 28 such that the scraper blade 10 can follow the trailing face 7 of the disc 5 when the disc 5 is somewhat warped or distorted, as is not uncommon during operation.

Figure 4:
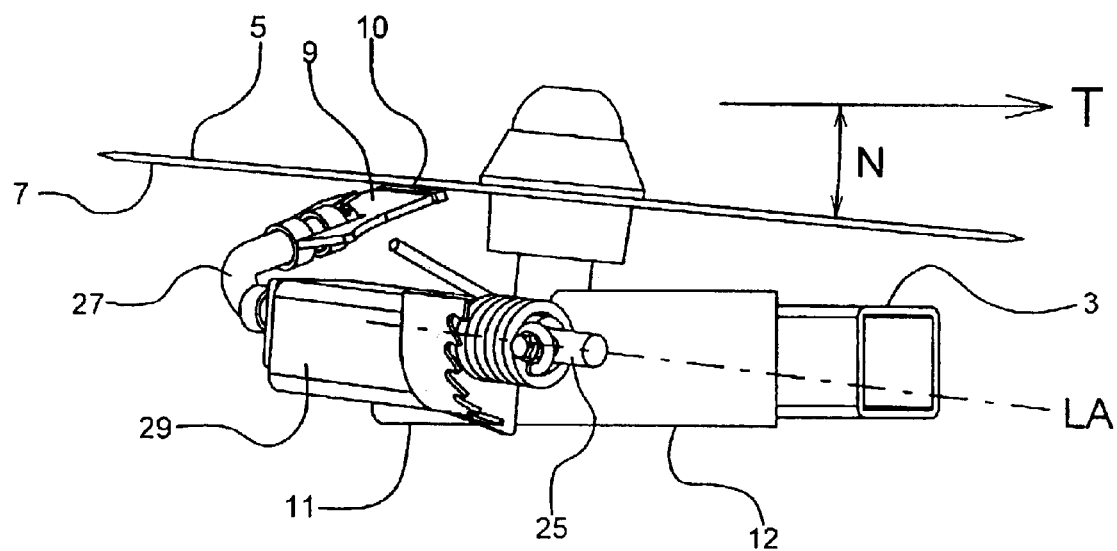
FIG. 4 is a schematic top view showing the alignment of the disc, scraper, scraper shaft, housing, arm, and coil spring.

The scraper shaft 25 pivots about a longitudinal axis LA that is oriented substantially parallel to a rotational plane of the disc 5, as seen in FIG. 4. The scraper bracket 11 comprises a housing 29 attached to the sleeve 12 at an angle that corresponds to the angle N to the direction of travel T. The scraper shaft 25 is pivotally mounted in the housing 29 and extends out the front end of the housing 29 to engage the coil spring 23. The coil spring 23 is attached at the front end to the scraper shaft 25, and a rear leg 31 of the coil spring 23 is engaged in one of a plurality of notches 33 in an adjustment member 35 attached to the end of the housing 29. The bias force on the scraper 9 is adjusted by placing the leg 31 in different notches 33.

The sleeve 12 is moved inward along the arm 3 as the disc 5 wears. As best seen in FIG. 4, the scraper shaft 25 is maintained parallel to the disc 5 as the sleeve 12 moves forward. The scraper shaft 25 also moves slightly closer to the disc 5 as the sleeve 12 moves forward, but the scraper blade 10 is maintained parallel to the trailing face 7 of the disc 5. The scraper blade 10 is also maintained touching the trailing face 7 by the bias force of the coil spring 23. Although the movement of the scraper shaft 25 closer to the disc 5 is quite small, if necessary the leg 31 of the coil spring 23 can be moved to a different notch 33 to maintain the correct bias force.

Other mechanisms to provide a bias force on the scraper blade 10 could be provided as well. Alternatively, an adjusting mechanism could be provided to maintain the scraper blade 10 in close proximity to the disc 5 if it is desired that the scraper blade 10 not exert a force on the disc 5. Such forces, if too high, can cause excessive rolling resistance. Both configurations are used in prior art disc furrow openers.

The scraper 9 and bias mechanism are attached to the scraper bracket 11 such that both move along the arm 3 as the disc 5 wears. In order to maintain, during adjustment for disc wear, the preferred cooperating relationship between the scraper 9 and a tube 41 for depositing agricultural material into the furrow, the tube 41 is also attached to the scraper bracket 11 such that the tube 41 also moves inward along the arm 3 when the scraper 9, and bias mechanism move inward. The output end of the tube 41 is located substantially between the trailing face 7 of the disc 5 and the scraper 9 in a preferred location for ensuring the agricultural material falls into the furrow.

The useful life of the disc 5 is extended, since the scraper 9, tube 41, and bias mechanism can all be moved inward together along the trailing face 7 of the disc 5 as the disc wears. Thus the scraper blade 10 can be located adjacent to the outside edge 21 of the disc 5, and progressively moved inwards as required. The disc 5 will create a satisfactory furrow through a considerable range of reduced diameter, and the apparatus of the invention allows adjustment to maintain satisfactory operation of the scraper 9 and proper delivery of agricultural material from the tube 41 to the furrow through a substantial range of diameters.

FIG. 1 illustrates the scraper 9 located in an operating position on a new disc 5. FIG. 2 illustrates the scraper 9 moved inward along the trailing face 7 to its inner limit as indicated by the holes in the arm 3 located at the end of the slot 13 in sleeve 12.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A furrow opener apparatus adapted for attachment to an implement for movement along the ground in an operating travel direction, the apparatus comprising:
   a disc rotatably attached to the apparatus in a generally upright orientation at an angle to the operating travel direction such that when a leading face of the disc engages the ground, a furrow is formed adjacent to a trailing face of the disc;
   a scraper having a scraper blade oriented substantially parallel to the trailing face of the disc, and mounted such that the scraper blade is oriented in proximity to or touching a lower portion of the trailing face adjacent to an outer edge of the disc;
   wherein the scraper is adjustably attached to the apparatus such that the scraper blade can be moved inward along the trailing face away from the outer edge of the disc while being maintained substantially parallel to the trailing face of the disc and in proximity to or touching the trailing face of the disc.

2. The apparatus of claim 1 further comprising an arm adapted for pivotal attachment at a front end thereof to the implement, and wherein the disc is rotatably attached to the arm, and wherein the scraper is adjustably attached to the arm such that a location of the scraper with respect to the arm can be adjusted.

3. The apparatus of claim 2 further comprising a scraper bracket adjustably attached to the arm such that the scraper bracket can be moved along the arm and can be locked to the arm in a desired location relative to the arm, and wherein the scraper is attached to a rear portion of the scraper bracket behind a center of the disc and extends down behind the center of the disc.

4. The apparatus of claim 3 wherein the scraper bracket defines a slot, and wherein the scraper bracket is adjustably attached to the arm by a bolt through the slot.

5. The apparatus of claim 4 wherein the slot is notched, and wherein the bolt comprises a square head that engages notches in the slot.

6. The apparatus of claim 3 further comprising a bias element attached to the scraper bracket and operative to exert a bias force against the scraper to push the scraper blade against the trailing face of the disc.

7. The apparatus of claim 6 wherein the bias element comprises a coil spring, and wherein the scraper is attached to a scraper shaft that extends through and engages the coil spring such that the coil spring exerts the bias force on the scraper shaft.

8. The apparatus of claim 7 wherein the scraper shaft pivots about a longitudinal axis that is oriented substantially parallel to a rotational plane of the disc.

9. The apparatus of claim 8 wherein the bias force exerted by the coil spring is adjustable.

10. The apparatus of claim 6 wherein the bias force is adjustable.

11. The apparatus of claim 6 further comprising a tube for depositing agricultural material into the furrow wherein the tube is attached to the scraper bracket such that an output end of the tube is located between the trailing face of the disc and the scraper.

12. The apparatus of claim 1 further comprising a tube for depositing agricultural material into the furrow wherein the tube is attached to the apparatus such that an output end of the tube is located between the trailing face of the disc and the scraper, and such that the output end of the tube moves inward when the scraper moves inward.

13. The apparatus of claim 12 wherein the output end of the tube is attached to the scraper.

14. A furrow opener apparatus adapted for attachment to an implement for movement along the ground in an operating travel direction, the apparatus comprising:
   an arm adapted for pivotal attachment at a front end thereof to the implement;
   a disc rotatably attached to a rear portion of the arm in a generally upright orientation at an angle to the operating travel direction such that when a leading face of the disc engages the ground, a furrow is formed adjacent to a trailing face of the disc;
   a scraper having a scraper blade and attached to a scraper bracket;
   wherein the scraper bracket is attached to the arm such that the scraper blade is oriented substantially parallel to the trailing face of the disc in proximity to or touching a lower portion of the trailing face adjacent to an outer edge of the disc;
   wherein the attachment of the scraper bracket to the arm is adjustable such that the scraper bracket can be moved along the arm and can be locked to the arm in a desired location relative to the arm, such that the scraper blade can be moved inward along the trailing face as the disc wears and such that the scraper blade is maintained substantially parallel to the trailing face of the disc and in proximity to or touching the trailing face of the disc as the scraper blade moves inward.

15. The apparatus of claim 14 further comprising a tube for depositing agricultural material into the furrow wherein the tube is attached to the scraper bracket such that an output end of the tube is located between the trailing face of the disc and the scraper.

16. The apparatus of claim 14 further comprising a bias element attached to the scraper bracket and operative to exert a bias force against the scraper to push the scraper blade against the trailing face of the disc.

17. The apparatus of claim 16 wherein the bias element comprises a coil spring, and wherein the scraper is attached to a scraper shaft that extends through and engages the coil spring such that the coil spring exerts the bias force on the scraper shaft.

18. The apparatus of claim 17 wherein the scraper shaft pivots about a longitudinal axis that is oriented substantially parallel to a rotational plane of the disc.

19. The apparatus of claim 18 wherein the bias force exerted by the coil spring is adjustable.

* * * * *